(12) United States Patent
Kwon

(10) Patent No.: US 10,322,644 B2
(45) Date of Patent: Jun. 18, 2019

(54) APPARATUS AND METHOD FOR CONTROLLING COOLING FAN OF BATTERY OF VEHICLE

(71) Applicant: Hyundai Motor Company, Seoul (KR)

(72) Inventor: Mun Soon Kwon, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 767 days.

(21) Appl. No.: 14/943,289

(22) Filed: Nov. 17, 2015

(65) Prior Publication Data

US 2017/0072814 A1 Mar. 16, 2017

(30) Foreign Application Priority Data

Sep. 11, 2015 (KR) ........................ 10-2015-0129245

(51) Int. Cl.
*B60L 11/18* (2006.01)
*F04D 19/00* (2006.01)
(Continued)

(52) U.S. Cl.
CPC ........... *B60L 11/1874* (2013.01); *B60L 58/26* (2019.02); *F04D 19/002* (2013.01); *F04D 25/06* (2013.01); *F04D 27/004* (2013.01); *H01M 10/4257* (2013.01); *H01M 10/613* (2015.04); *H01M 10/625* (2015.04); *H01M 10/63* (2015.04); *H01M 10/6563* (2015.04); F05D 2260/84 (2013.01); F05D 2270/094 (2013.01); H01M 2010/4271 (2013.01); H01M 2010/4278 (2013.01); *H01M 2220/20* (2013.01)

(58) Field of Classification Search
CPC ........... B60L 11/1874; H01M 2220/20; H01M 2010/4278; H01M 2010/4271; H01M 10/4257; H01M 10/6563; H01M 10/63; H01M 10/625; H01M 10/613; F05D 2270/094; F05D 2260/84; F04D 27/004; F04D 25/06; F04D 19/002
See application file for complete search history.

(56) References Cited

U.S. PATENT DOCUMENTS

2006/0172188 A1* 8/2006 Okuda .................. B60L 3/0046
429/120
2014/0370333 A1* 12/2014 Kwon ..................... B60L 11/18
429/50

FOREIGN PATENT DOCUMENTS

KR  10-2005-0042339 A  5/2005
KR  10-2008-0092688 A  10/2008
(Continued)

*Primary Examiner* — Jerrah Edwards
*Assistant Examiner* — Mathew Franklin Gordon
(74) *Attorney, Agent, or Firm* — Mintz Levin Cohn Ferris Glovsky and Popeo, P.C.; Peter F. Corless

(57) ABSTRACT

An apparatus and method for controlling a cooling fan of a battery of a vehicle are provided. The apparatus includes a motor controller that drives a cooling fan motor of the battery based on information regarding control conditions of the cooling fan motor, and requests a backup process of a control of the cooling fan motor when an error in CAN communication by a CAN communicator or an error of the vehicle occurs. A backup processor then compensates for an output signal of the cooling fan based on at least one of an air conditioner pressure transducer (APT) output value, a vehicle speed, and a cooled water temperature and transmits the compensated output signal of the cooling fan to the motor controller.

17 Claims, 9 Drawing Sheets

(51) Int. Cl.
    *H01M 10/42*     (2006.01)
    *H01M 10/625*     (2014.01)
    *H01M 10/63*     (2014.01)
    *H01M 10/6563*     (2014.01)
    *F04D 25/06*     (2006.01)
    *H01M 10/613*     (2014.01)
    *F04D 27/00*     (2006.01)
    *B60L 58/26*     (2019.01)

(56) References Cited

FOREIGN PATENT DOCUMENTS

| | | | |
|---|---|---|---|
| KR | 10-1428387 | B1 | 8/2014 |
| KR | 10-2014-0147171 | A | 12/2014 |

\* cited by examiner

| CLASSIFICATION | APT OUTPUT VALUE(Vout) | COOLED WATER TEMPERATURE | DESCRIPTION OF VEHICLE STATE |
|---|---|---|---|
| CONDITION A: APT OF LOW PRESSURE, COOLED WATER OF LOW TEMPERATURE | 0V ~ 1.5V | EQUAL TO OR LESS THAN 90°C | IGNITION IS TURNED ON AND AIR CONDITIONER IS TURNED ON |
| CONDITION B | 1.5V | - | IGNITION IS TURNED ON AND AIR CONDITIONER IS TURNED OFF |
| CONDITION C | 1.5V ~ 5V | - | IGNITION IS TURNED ON AND AIR CONDITIONER IS TURNED ON |
| CONDITION D: ERROR MODE CONDITION (OPEN OR SHORT STATE OF VDD CIRCUIT) | 0V or 5V | EQUAL TO OR MORE THAN 100°C | IGNITION IS TURNED ON (AIR CONDITIONER IS TURNED ON OR OFF) |

FIG.4

APPARATUS AND METHOD FOR CONTROLLING COOLING FAN OF BATTERY OF VEHICLE

CROSS-REFERENCE TO RELATED APPLICATION

This application is based on and claims the benefit of priority to Korean Patent Application No. 10-2015-0129245, filed on Sep. 11, 2015 in the Korean Intellectual Property Office, the disclosure of which is incorporated herein in its entirety by reference.

TECHNICAL FIELD

The present disclosure relates to an apparatus and method for controlling a cooling fan of a vehicle battery utilizing a simplified configuration.

BACKGROUND

A battery cooling system of an eco-friendly vehicle such as a hybrid vehicle, an electric vehicle, a fuel cell vehicle, or the like is operated to cool a battery at a predetermined temperature to maintain the battery at optimal performance. A battery cooling system according to the related art has a structure in which a cooling fan relay connected to an auxiliary battery power supply, a motor driving controller, and the like are integrated in a cooling fan motor controller.

Particularly, a battery management system (BMS) is connected to the relay and the motor driving controller of the cooling fan motor controller via a wire. Therefore, when the wire is disconnected, it is impossible to perform an ON/OPP control for the relay and it is impossible to transmit a speed control signal (e.g., a pulse width modulation (PWM) signal) to the motor driving controller. In addition, when the relay of the cooling fan motor controller is turned on/off in a normal state, noise may occur. An expensive rotation speed sensor of printed circuit board (PCB) type configured to sense motor speed is separately mounted in the cooling fan motor controller, which causes an increase in cost for manufacturing the battery cooling system.

SUMMARY

The present disclosure provides an apparatus and method for controlling a cooling fan of a battery capable of simplifying a configuration of the apparatus for controlling the cooling fan by performing communication with a battery management system via controller area network (CAN) communication to remove a relay, a PCB sensor, or the like.

An aspect of the present disclosure also provides an apparatus and method for controlling a cooling fan of a battery capable of preventing malfunction of the apparatus for controlling the cooling fan by performing a control based on at least one of an air conditioner pressure transducer (APT) output value, a cooled water temperature, and a vehicle speed, when a communication error between the apparatus for controlling the cooling fan and a battery management system occurs.

According to an exemplary embodiment of the present disclosure, an apparatus for controlling a cooling fan of a battery of a vehicle may include a controller area network (CAN) communicator configured to transmit and receive a signal with a battery management system (BMS) of the vehicle, and receive information regarding control conditions of a cooling fan motor; a motor controller configured to drive the cooling fan motor of the battery based on the received information regarding the control conditions of the cooling fan motor, and request a backup process of a control of the cooling fan motor when error in CAN communication by the CAN communicator or a vehicle error occurs; and a backup processor configured to compensate for an output signal of the cooling fan based on at least one of an air conditioner pressure transducer (APT) output value, a vehicle speed, and a cooled water temperature according to the request of the motor controller and transmit the compensated output signal of the cooling fan to the motor controller.

When the error in the CAN communication occurs and the APT output value satisfies a first condition, the backup processor may be configured to operate the motor controller to adjust an output of the cooling fan motor based on an air volume of an air conditioner. When the error in the CAN communication occurs and the APT output value does not satisfy a first condition, the backup processor may be configured to compensate for a control output of a previous output signal of the cooling fan by about 150% and transmit the compensated output signal of the cooling fan to the motor controller. The first condition may be that the APT output value is equal to or greater than about 1.5V and less than about 5V.

When the error in the CAN communication occurs and the APT output value satisfies a second condition, the backup processor may be configured to determine whether a vehicle speed sensor fails (e.g., an error occurs with the sensor), and when the vehicle speed sensor fails, the backup processor may be configured to operate the motor controller to adjust the cooling fan motor at a maximum output. The second condition may be that the APT output value is about 0V. When the vehicle speed sensor does not fail and the vehicle speed is less than a reference speed, the backup processor may be configured to compensate for a control output of a previous output signal of the cooling fan by about 120% and transmit the compensated output signal of the cooling fan to the motor controller.

When the vehicle speed sensor does not fail and the vehicle speed is equal to or greater than a reference speed, the backup processor may be configured to compensate for a control output of a previous output signal of the cooling fan to be about 80% of a maximum output of the cooling fan motor and transmit the compensated output signal of the cooling fan to the motor controller. When the APT output value and the cooled water temperature satisfy a third condition when an air conditioner is operated in a turned-on state, the backup processor may be configured to determine an error state of the vehicle and compensate for a control output of a previous output signal of the cooling fan by about 70% to transmit the compensated output signal of the cooling fan to the motor controller. The third condition may be that the APT output value exceeds about 0V and is less than about 1.5V, and the cooled water temperature is equal to or less than about 90° C.

Additionally, when the APT output value and the cooled water temperature satisfy a fourth condition when an air conditioner is operated in a turned-on state, the backup processor may be configured to determine an error state of the vehicle and compensate for a control output of a previous output signal of the cooling fan by about 150% to transmit the compensated output signal of the cooling fan to the motor controller. The fourth condition may be that the APT output value is about 0V or 5V, and the cooled water temperature is equal to or greater than about 100° C.

According to another exemplary embodiment of the present disclosure, a method for controlling a cooling fan of a battery of a vehicle may include transmitting and receiving a signal with a battery management system (BMS) of the vehicle via a CAN communication, and receiving information regarding control conditions of a cooling fan motor; driving the cooling fan motor of the battery based on the received information regarding the control conditions of the cooling fan motor; when error in controller area network (CAN) communication or an error state of the vehicle occurs while the cooling fan motor is driven, compensating for an output signal of the cooling fan based on at least one of an air conditioner pressure transducer (APT) output value, a vehicle speed, and a cooled water temperature; and operating the cooling fan motor according to the compensated output signal of the cooling fan.

The compensation for the output signal of the cooling fan may include compensating for a control output of a previous output signal of the cooling fan by about 150% when the APT output value does not satisfy a first condition when the error in the CAN communication occurs, and operating the cooling fan motor based on the compensated output signal of the cooling fan. The compensation for the output signal of the cooling fan may include: determining whether a vehicle speed sensor fails when the APT output value satisfies a second condition when the error in the CAN communication occurs; and operating the cooling fan motor at a maximum output when the vehicle speed sensor fails as a result of determining of whether the vehicle speed sensor fails.

Furthermore, the compensation for the output signal of the cooling fan may include compensating for a control output of a previous output signal of the cooling fan by about 120% when the vehicle speed is less than a reference speed and compensating for the control output of the previous output signal of the cooling fan to be about 80% of a maximum output of the cooling fan motor when the vehicle speed is equal to or greater than the reference speed, when the vehicle speed sensor does not fail as the result of determining of whether the vehicle speed sensor fails.

The compensation for the output signal of the cooling fan may additionally include determining an error state of the vehicle and compensating for a control output of a previous output signal of the cooling fan by about 70%, when the APT output value and the cooled water temperature satisfy a third condition when an air conditioner is operated in a turned-on state. The compensation for the output signal of the cooling fan may include determining an error state of the vehicle and compensating for a control output of a previous output signal of the cooling fan by about 150%, when the APT output value and the cooled water temperature satisfy a fourth condition when an air conditioner is operated in a turned-on state.

BRIEF DESCRIPTION OF THE DRAWINGS

The above and other objects, features and advantages of the present disclosure will be more apparent from the following detailed description taken in conjunction with the accompanying drawings.

FIGS. 2, 3A-3C, and 4 are diagrams illustrating an operation of the apparatus for controlling a cooling fan of a battery of a vehicle according to an exemplary embodiment of the present disclosure;

DETAILED DESCRIPTION

Figure 1:
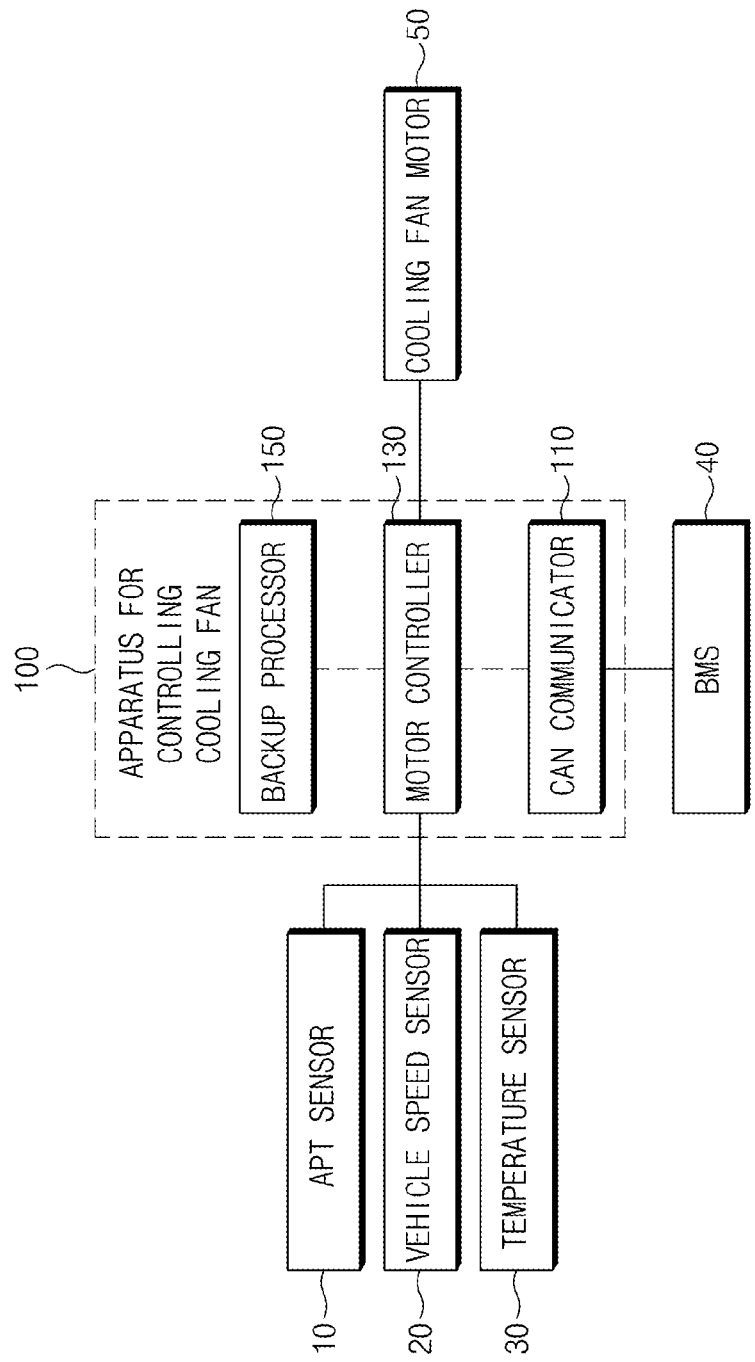
FIG. 1 is a diagram illustrating an apparatus for controlling a cooling fan of a battery of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

It is to be noted that technical terms used in the specification are used for describing specific embodiments and do not limit the present disclosure. In addition, unless indicated otherwise in the present disclosure, it is to be understood that all the technical terms used in the present disclosure are construed as meaning as those that are generally understood by those who skilled in the art and are not construed as excessively comprehensive meanings and excessively reduced meanings. In addition, when the technical terms used in the present disclosure are wrong technical terms that do not accurately indicate the technical spirit of the present disclosure, it is to be understood that the terms are replaced with the technical terms understood by those skilled in the art. Further, the general terms used in the present disclosure must be understood according to the meanings defined by the dictionary or the context and should not be excessively reduced meanings.

In addition, terms including an ordinal number such as first, second, or the like, used in the present disclosure may be used to describe components. However, these components are not limited to these terms. The terms are only used to distinguish one component from another component. For example, the 'first' component may be named as the 'second' component, and vice versa, without departing from the scope of the present disclosure. Hereinafter, exemplary embodiments of the present disclosure will be described in more detail with reference to the accompanying drawings. The same reference numerals will be used to describe the same or like components, independent of the reference numerals and an overlapped description of the same components will be omitted.

Further, when it is determined that the detailed description of the known art related to the present disclosure may obscure the gist of the present disclosure, the detailed description thereof will be omitted. In addition, it is to be noted that the accompanying drawings are provided only to allow the spirit of the present disclosure to be easily understood and is to be interpreted as limiting the spirit of the present disclosure.

An apparatus for controlling a cooling fan of a battery of a vehicle according to the present disclosure may be implemented within the vehicle. In particular, the apparatus 100 for controlling a cooling fan may be formed integrally with internal controllers of the vehicle, and may also be implemented by an independent hardware apparatus to be connected to the various controllers of the vehicle by a separate connection means. The apparatus 100 for controlling a cooling fan may be operated in connection with an air conditioner pressure transducer (APT) sensor, a vehicle speed sensor, a temperature sensor, a battery management system (BMS), a cooling fan motor of a battery, and the like, of the vehicle.

FIG. 1 is a diagram illustrating a configuration of an apparatus for controlling a cooling fan of a battery of a vehicle according to an exemplary embodiment of the present disclosure. Referring to FIG. 1, an apparatus 100 for controlling a cooling fan of a battery of a vehicle (hereinafter, referred to as 'apparatus for controlling a cooling fan') according to an exemplary embodiment of the present disclosure may include a controller area network (CAN) communicator 110, a motor controller 130, and a backup processor 150.

The CAN communicator 110 may be configured to transmit and receive a signal with a battery manage system (BMS) 40, and may be configured to receive predetermined control information from the battery management system 40. In particular, the battery management system 40 may be configured to manage a state of the vehicle battery. When the ignition of the vehicle is turned on and an ignition signal is received, the battery management system 40 may be configured to provide control conditions of a cooling fan motor 50 to the apparatus 100 for operating a cooling fan via the CAN communication.

The CAN communicator 110 may be configured to receive the control conditions of the cooling fan motor 50 from the battery management system 40 and transmit the control conditions to a motor controller 130, and may provide processing results based on the control conditions of the cooling fan motor 50 to the battery management system 40. Therefore, the battery management system 40 may be configured to monitor an operation processing result of the cooling fan motor 50 received from the CAN communicator 110.

When the motor controller 130 receives the control conditions of the cooling fan motor 50, for example, a battery temperature, a motor temperature, a vehicle speed, a motor rotation speed range for each battery temperature, and the like, from the CAN communicator 110, the motor controller 130 may be configured to drive the cooling fan motor 50 based on the corresponding control condition. Particularly, the motor controller 130 may be configured to receive a value measured by at least one of an air conditioner pressure transducer (APT) sensor 10, a vehicle speed sensor 20, and a temperature sensor 30 of the vehicle, and adjust an output of the cooling fan motor 50 based the received value (e.g., data results).

Figure 2:
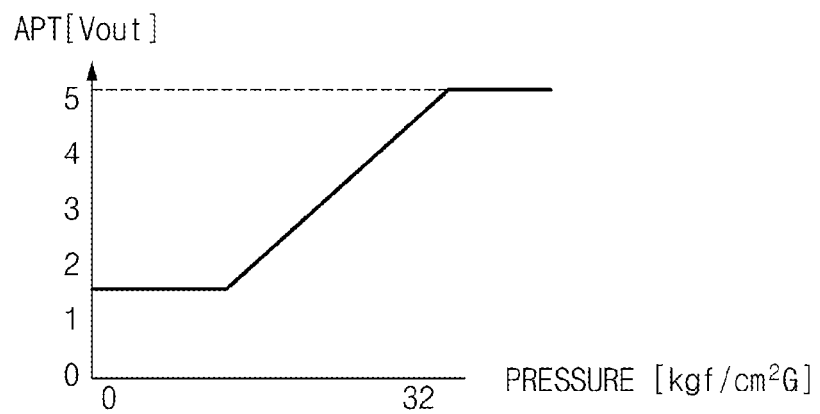

The APT sensor is a power supply sensor, and an output value of the APT sensor represents a current state of the vehicle. In particular, the output value Vout of the APT sensor 10 may have a voltage level between about 1.5V and 5V, based on pressure, as illustrated in FIG. 2. The vehicle speed sensor 20 is a sensor that may be configured to sense a speed of the vehicle. In addition, the temperature sensor 30 is a sensor that may be configured to sense a temperature of the battery of the vehicle.

Meanwhile, when an error occurs in the CAN communication with the battery management system, the CAN communicator 110 may be configured to sense or detect the error in the CAN communication and inform the motor controller 130 of the error. When the error in the CAN communication between the CAN communicator 110 and the battery management system 40 is sensed, the motor controller 130 may be configured to execute a backup control for the cooling fan motor 50 using a backup processor 150. In particular, the backup processor 150 may be configured to compensate for a signal output to the cooling fan motor 50 based on sensor values measured by the APT sensor 10, the vehicle speed sensor 20, and the temperature sensor 30, and transmit the compensated signal to the motor controller 130. Therefore, the motor controller 130 may be configured to adjust an output of the cooling fan motor 50 based on the signal compensated by the backup processor 150.

Specifically, when the error in the CAN communication is sensed, the backup processor 150 may be configured to confirm an APT output value Vout from the APT sensor 10 and determine whether the confirmed APT output value satisfies a predetermined condition. As an example, the backup processor 150 may be configured to determine whether the APT output value Vout satisfies a condition of 1.5V≤Vout≤5V. When the APT output value Vout satisfies the condition of 1.5V≤Vout≤5V, the backup processor 150 may be configured to output a first control signal to the motor controller 130.

Figure 3A:
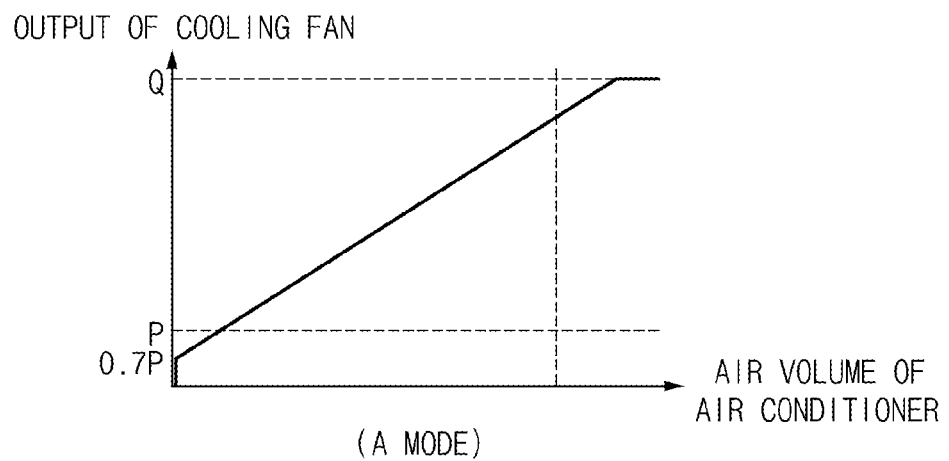
Figure 3B:
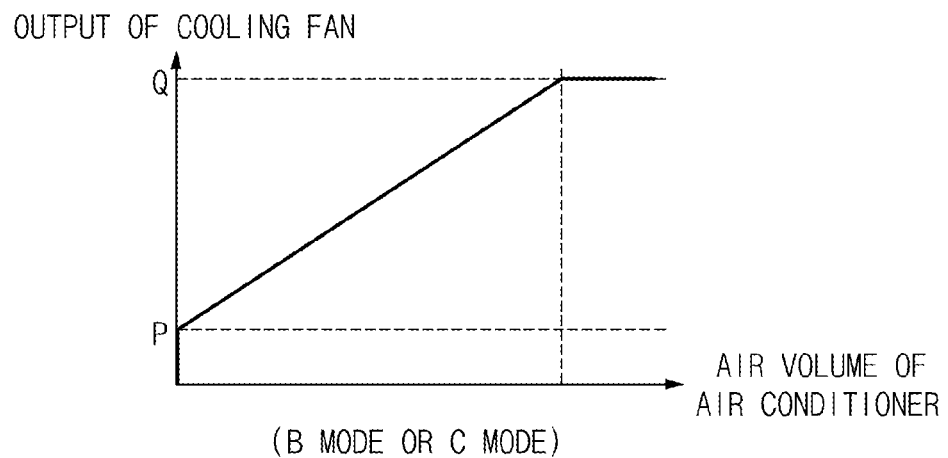

When the motor controller 130 receives the first control signal from the backup processor 150, the motor controller 130 may be configured to enter a B mode or a C mode based on a condition B and a condition C defined in Table of FIG. 4 to adjust the output of the cooling fan motor 50 based on an air volume of an air conditioner, as in a graph illustrated in FIG. 3B. When the motor controller 130 enters the B mode, the air conditioner may be in an OFF state and as a result, the air volume of the air conditioner may be zero. Therefore, the motor controller 130 may be configured to adjust the output of the cooling fan motor 50 based on a lowest output control value P. Meanwhile, when the motor controller 130 enters the C mode, the motor controller 130 may be configured to adjust the output of the cooling fan motor 50 based on a value between the P value and a highest output control value Q according to the air volume of the air conditioner.

Meanwhile, when the APT output value Vout does not satisfy the condition of 1.5V≤Vout≤5V, the backup processor 150 may be configured to enter a first compensation control mode to compensate for the output of the cooling fan by the motor controller 130 and output a second control signal to the motor controller 130. As an example, the backup processor 150 may be configured to compensate for the output of the cooling fan by the motor controller 130 to be about 150% of a previous control output, and output the second control signal that corresponds to the compensated control output to the motor controller 130. In particular, the motor controller 130 may be configured to adjust the output of the cooling fan motor 50 to be an output value compensated by about 150% according to the second control signal from the backup processor 150.

When the APT output value Vout does not satisfy the condition of 1.5V≤Vout≤5V and is about 0V, the backup processor 150 may be configured to determine whether the vehicle speed sensor 20 fails, from a vehicle speed sensor signal. In particular, when the backup processor 150 detects the failure of the vehicle speed sensor 20, the backup processor 150 may be configured to output a third control signal to the motor controller 130. In addition, the backup processor 150 may be configured to output an alarm on a dashboard (not illustrated) in response to the failure of the vehicle speed sensor 20. When the motor controller 130 receives the third control signal from the backup processor 150, the motor controller 130 may be configured to adjust the cooling fan motor 50 to be a maximum output of the cooling fan motor 50.

Meanwhile, when the failure of the vehicle speed sensor 20 is not detected, the backup processor 150 may be configured to confirm whether the vehicle speed sensed by the vehicle speed sensor 20 is less than a reference speed α, and when the vehicle speed sensed by the vehicle speed sensor 20 is less than the reference speed α, the backup processor 150 may be configured to enter a second compensation control mode to compensate for the output of the cooling fan by the motor controller 130 to be about 120% of the previous control output. In particular, the backup controller may be configured to output a fourth control signal that corresponds to the compensated control output to the motor controller 130.

Furthermore, when the vehicle speed sensed by the vehicle speed sensor 20 is not less than (e.g., is equal to or greater than) the reference speed α, the backup processor 150 may be configured to enter a third compensation control mode to compensate for the output of the cooling fan by the motor controller 130 to be about 80% of the maximum output. Particularly, the backup controller may be configured to output a fifth control signal that corresponds to the compensated control output to the motor controller 130.

The motor controller 130 may be configured to adjust the output of the cooling fan motor 50 to be an output value compensated according to the fourth control signal or the fifth control signal from the backup processor 150. Accordingly, whether the error in the CAN communication occurs may be determined, and when the error in the CAN communication occurs, a control voltage for driving the cooling fan motor 50 may be adjusted and output based on the APT output value, the vehicle speed, etc., thereby making it possible to more stably perform a cooling control operation.

Moreover, the backup processor 150 may be configured to determine whether the APT output value and the cooled water temperature satisfy predetermined conditions while the motor controller 130 operates the cooling fan motor while the air conditioner of the vehicle is operated in an ON state, in addition to when the error n the CAN communication occurs, thereby making it possible to operate the cooling fan motor or perform a compensation control. In particular, the backup processor 150 may be configured to determine whether the APT output value Vout and the cooled water temperature satisfy a condition A (0V<Vout<1.5V), a condition C (1.5<Vout<5V), or a condition D (Vout=0V or 5V) as defined in Table of FIG. 4.

When the APT output value Vout and the cooled water temperature satisfy the condition C (1.5<Vout<5V), the backup processor 150 may be configured to output a sixth control signal to the motor controller 130. The motor controller 130 may then be configured to enter the C mode according to the sixth control signal to adjust the output of the cooling fan motor based on the air volume of the air conditioner, as in a graph illustrated in FIG. 3B.

When the APT output value Vout and the cooled water temperature satisfy the condition A (0V<Vout<1.5V) or the condition D (Vout=0V or 5V), the backup processor 150 may be configured to execute the compensation control. Particularly, when the APT output value Vout and the cooled water temperature satisfy the condition A (0V<Vout<1.5V), the backup processor 150 may be configured to compensate for the output of the cooling fan by the motor controller 130 to about 70% of the previous control output, and output the seventh control signal that corresponds to the compensated control output to the motor controller 130.

In addition, the motor controller 130 may be configured to enter the A mode according to the seventh control signal from the backup processor 150 to adjust the output of the cooling fan motor 50 to be a value between a value of about 70% of a P value and a Q value based on the air volume of the air conditioner, as in the graph illustrated in FIG. 3A. When the APT output value Vout and the cooled water temperature satisfy the condition D (Vout=0V or 5V), the backup processor 150 may be configured to compensate for the output of the cooling fan by the motor controller 130 to about 150% of the previous control output, and output an eighth control signal that corresponds to the compensated control output to the motor controller 130.

Figure 3C:
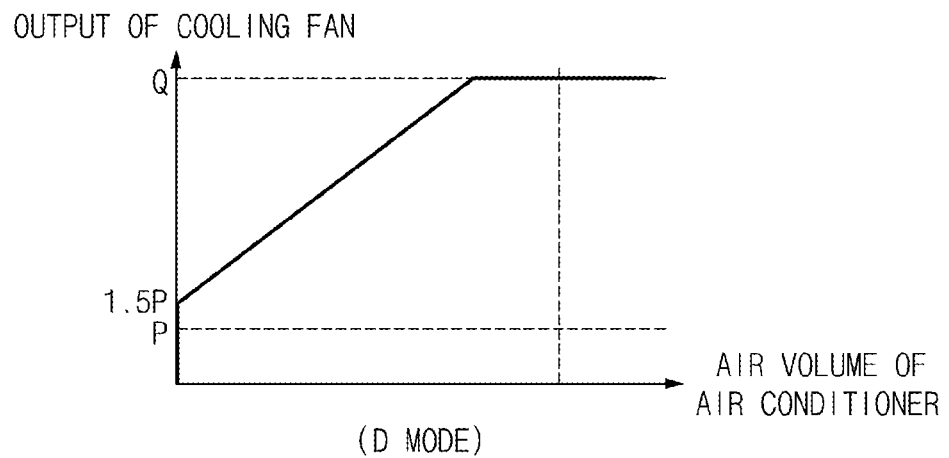

Particularly, the motor controller 130 may be configured to enter the D mode according to the eighth control signal from the backup processor 150 to adjust the output of the cooling fan motor 50 to be a value between a value of about 150% of the P value and the Q value based on the air volume of the air conditioner, as in a graph illustrated in FIG. 3C.

Although FIG. 1 illustrates the battery management system (BMS) 40 connected to the apparatus 100 for controlling a cooling fan via the CAN communicator 110, the battery management system 40 may also be connected to the apparatus 100 for controlling a cooling fan in another type of vehicle network communication scheme such as local interconnect network (LIN) communication, flex-ray communication, or the like.

Although not illustrated in FIG. 1, the apparatus 100 for controlling a cooling fan may further include an output device and/or a storage (e.g., a memory). The output device may include a display on which an operation state, a processing result, etc. of the apparatus 100 for controlling a cooling fan may be displayed, and a speaker. The display may be an apparatus separately implemented in the apparatus 100 for controlling a cooling fan, but may also be an apparatus indisposed within the vehicle such as the dashboard and may be connected to the apparatus 100 for controlling a cooling fan.

The storage may be configured to store a set value for an operation of the apparatus 100 for controlling a cooling fan. For example, the storage may be configured to store condition information predefined to operate the cooling fan motor 40, and may also be configured to store condition information used to compensate for the output value of the cooling fan motor 50 by the backup processor 150. In addition, the storage may also be configured to store an algorithm that compensates for the output value of the cooling fan motor 50 according to the respective control conditions. Particularly, the storage may include at least one storing medium of a flash memory type memory, a hard disk type memory, a multimedia card micro type memory, a card type memory (e.g., an SD or XD memory, or the like), a magnetic memory, a magnetic disk, an optical disk, a random access memory (RAM), a static random access memory (SRAM), a read-only memory (ROM), a programmable read-only memory (PROM), and an electrically erasable programmable read-only memory (EEPROM).

An operation flow of the apparatus for controlling a cooling fan of a battery of a vehicle according to the exemplary embodiment of the present disclosure configured as described above will be described below in detail.

Figure 5:
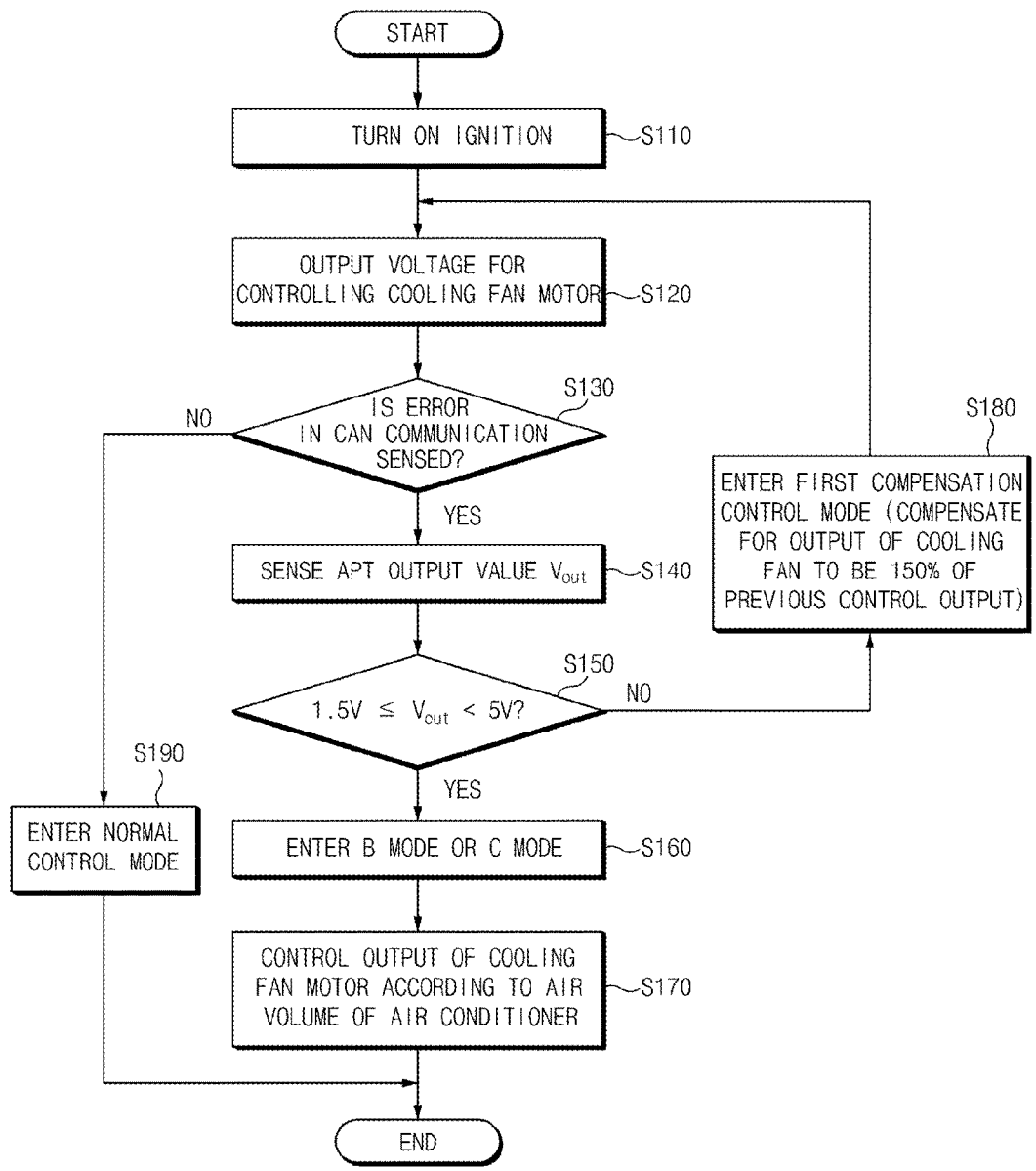
FIG. 5 is a diagram illustrating an operation flow of a method for controlling a cooling fan of a battery of a vehicle according to a first exemplary embodiment of the present disclosure.

FIG. 5 is a diagram illustrating an operation flow of a method for controlling a cooling fan of a battery of a vehicle according to a first exemplary embodiment of the present disclosure. As illustrated in FIG. 5, the apparatus for controlling a cooling fan may be configured to output a voltage for controlling the cooling fan motor, when an ignition is turned on (S110). When the error in the CAN communication between the apparatus for controlling a cooling fan and the battery management system is not detected (S130), the apparatus for controlling a cooling fan may be continuously operated in a normal control mode for controlling the cooling fan motor while the error in the CAN communication is not detected (S190).

Meanwhile, in operation 'S130', when the error in the CAN communication is detected, the apparatus for controlling a cooling fan may be configured to execute a compensation process for the output value of the cooling fan motor. Accordingly, the apparatus for controlling a cooling fan may be configured to sense the APT output value Vout of the APT sensor (S140). When a condition that the APT output value Vout sensed in operation 'S140' is equal to or greater than about 1.5V and is less than about 5V is satisfied (S150), the apparatus for controlling a cooling fan may be configured to enter the B mode or the C mode according to the condition B and the condition C as defined in Table of FIG. 4 (S160) to adjust the output of the cooling fan motor based on the air volume of the air conditioner, as in the graph illustrated in FIG. 3B (S170).

Meanwhile, when the condition that the APT output value Vout is equal to or greater than about 1.5V and is less than about 5V is not satisfied in operation 'S150', the apparatus for controlling a cooling fan may be configured to enter the first compensation control mode to compensate for the output of the cooling fan to be about 150% of the previous control output (S180) and adjust the cooling fan motor according to the compensated output value (S120). The operations 'S120' to 'S180' may be repeatedly performed while the error in the CAN communication is detected. When the error in the CAN communication is solved while the operations 'S120' to 'S180' may be performed, the apparatus for controlling a cooling fan may be configured to enter an operation 'S190' to operate the cooling fan motor in the normal control mode.

Figure 6:
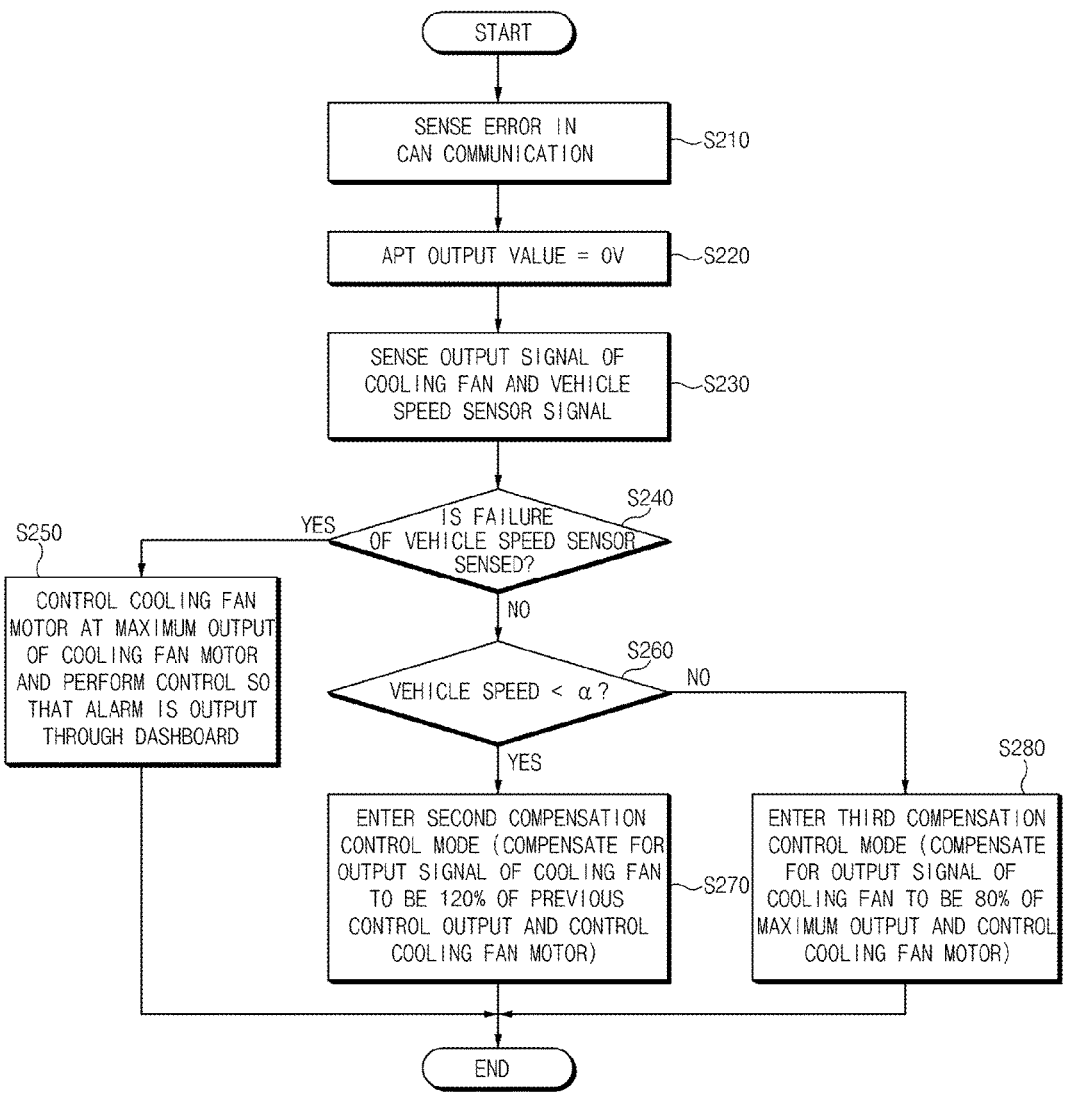
FIG. 6 is a diagram illustrating an operation flow of a method for controlling a cooling fan of a battery of a vehicle according to a second exemplary embodiment of the present disclosure.

FIG. 6 is a diagram illustrating an operation flow of a method for controlling a cooling fan of a battery of a vehicle according to a second exemplary embodiment of the present disclosure. As illustrated in FIG. 6, when the error in the CAN communication is detected while the apparatus for controlling a cooling fan operates the cooling fan motor while the ignition is turned on (S210) and the APT output value Vout of the APT sensor is about 0V (S220), the apparatus for controlling a cooling fan may be configured to sense the output signal of the cooling fan and the vehicle speed sensor signal (S230).

In particular, when the failure of the vehicle speed sensor is sensed from the vehicle speed sensor signal (S240), the apparatus for controlling a cooling fan may be configured to operate the cooling fan motor at the maximum output of the cooling fan motor and output an alarm through the dashboard of the vehicle (S250), for example, through a speaker disposed within the dashboard of the vehicle.

Meanwhile, when the failure of the vehicle speed sensor is not sensed from the vehicle speed sensor signal (S240), the apparatus for controlling a cooling fan may be configured to confirm whether the vehicle speed sensed from the vehicle speed sensor signal is less than the reference speed α. When the vehicle speed is less than the reference speed α (S260), the apparatus for controlling a cooling fan may be configured to enter the second compensation control mode to compensate for the output signal of the cooling fan to be about 120% of the previous control output, thereby operating the cooling fan motor (S270).

Furthermore, when the vehicle speed is not less than (e.g., is equal to or greater than) the reference speed α in operation 'S260', the apparatus for controlling a cooling fan may be configured to enter the third compensation control mode to compensate for the output signal of the cooling fan to be about 80% of the maximum output, thereby operating the cooling fan motor (S280).

Figure 7:
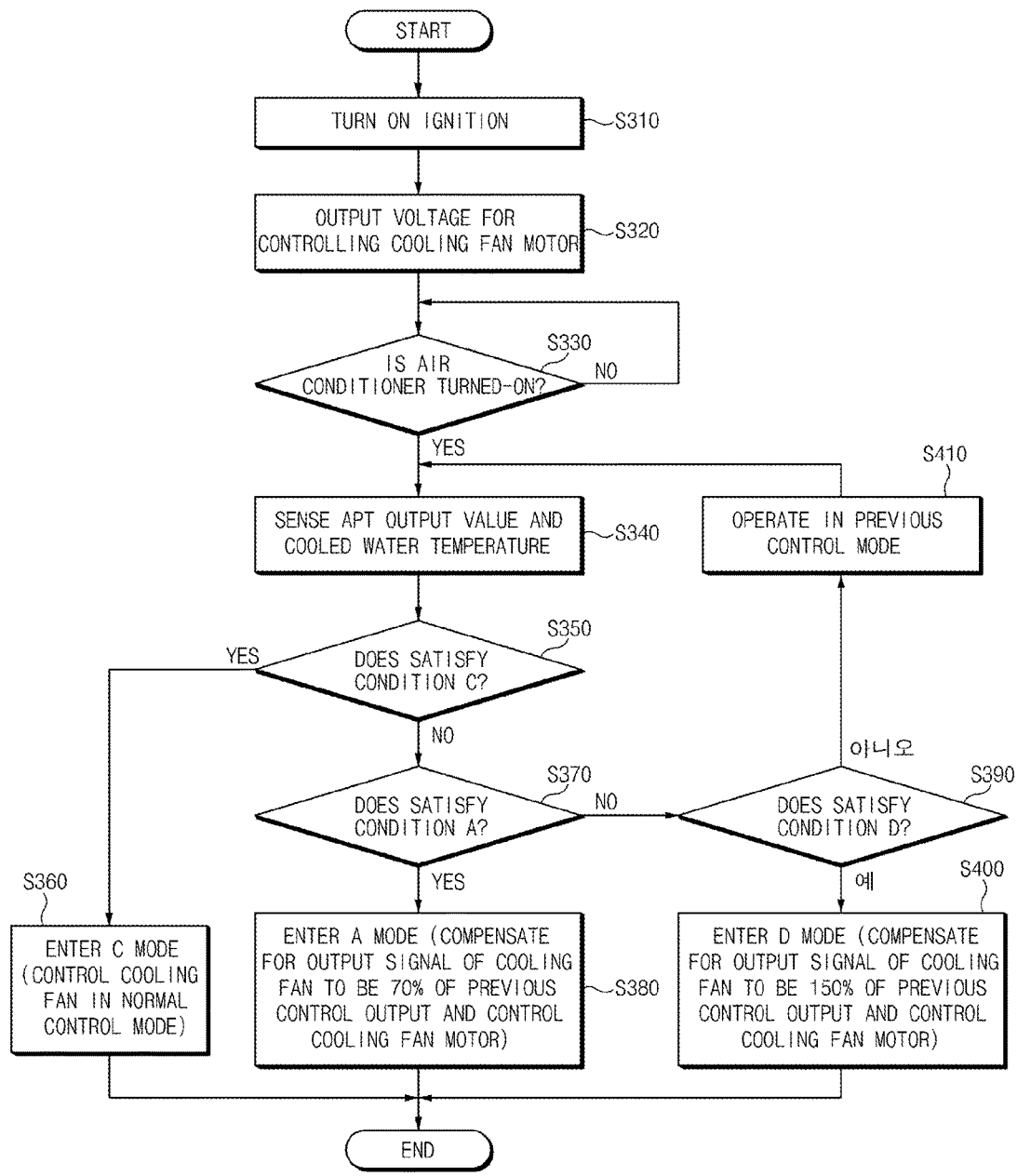
FIG. 7 is a diagram illustrating an operation flow of a method for controlling a cooling fan of a battery of a vehicle according to a third exemplary embodiment of the present disclosure.

FIG. 7 is a diagram illustrating an operation flow of a method for controlling a cooling fan of a battery of a vehicle according to a third exemplary embodiment of the present disclosure. As illustrated in FIG. 7, the apparatus for controlling a cooling fan may be configured to output a voltage for controlling the cooling fan motor, when an ignition is turned on (S310).

When the air conditioner is operated in a turned-on state, the apparatus for controlling a cooling fan may be configured to sense the APT output value Vout of the APT sensor and the cooled water temperature from the temperature sensor (S340). In particular, when the APT output value Vout and the cooled water temperature sensed in operation 'S340' satisfy the condition C (1.5<Vout<5V) defined in Table of FIG. 4 (S350), the apparatus for controlling a cooling fan may be configured to enter the C mode to control the output of the cooling fan motor according to the air volume of the air conditioner (S360).

When the APT output value Vout and the cooled water temperature sensed in operation 'S340' satisfy the condition A (0V<Vout<1.5V) (S370), the apparatus for controlling a cooling fan may be configured to enter the A mode to compensate for the output signal of the cooling fan to be about 70% of the previous control output, thereby operating the cooling fan motor (S380). When the APT output value Vout and the cooled water temperature sensed in operation 'S340' satisfy the condition D (Vout=0V or 5V) (S390), the apparatus for controlling a cooling fan may be configured to enter the D mode to compensate for the output signal of the cooling fan to be about 150% of the previous control output, thereby operating the cooling fan motor (S400).

Meanwhile, when the APT output value Vout and the cooled water temperature sensed in operation 'S340' do not satisfy the condition A, the condition C, and the condition D, the apparatus for controlling a cooling fan may be operated in a previous operation mode to adjust the cooling fan motor based on the previous output signal of the cooling fan (S410). The operations 'S340' to 'S410' may be repeatedly performed while the cooling fan motor is operated and the ignition and the air conditioner are turned on.

The above-mentioned operations may be directly implemented by hardware and software module executed by a processor, or a combination of two. The software module may be resided on a storing medium (i.e., a memory and/or a storage) such as a random access memory (RAM) memory, a flash memory, a read only memory (ROM) memory, an erasable programmable read only memory (EPROM) memory, an electrically erasable programmable read only memory (EEPROM) memory, a register, a hard disk, a removable disk, or a compact disc-read only memory (CD-ROM). An illustrative storing medium may be coupled to the processor and the processor may read information from the storing medium and write the information into the storing medium. Alternatively, the storing medium may be integral with the processor. The processor and the storing medium may be resided within an application specific integrated circuit (ASIC). The ASIC may be resided within a user terminal. Alternatively, the processor and the storing medium may be resided within the user terminal as an individual component.

As described above, it may be possible to simplify the configuration of the apparatus for controlling the cooling fan and reduce cost for manufacturing the apparatus for controlling the cooling fan by performing communication with the battery management system via the CAN communication to remove the relay, the PCB sensor, or the like. In addition, it may be possible to prevent malfunction of the apparatus for controlling the cooling fan by performing the control based on at least one of the APT output value, the cooled water temperature, and the vehicle speed, when communication error between the apparatus for controlling the cooling fan and the battery management system occurs.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An apparatus for controlling a cooling fan of a battery of a vehicle, comprising:
a controller area network (CAN) communicator configured to transmit and receive a signal with a battery management system (BMS) of the vehicle, and receive information regarding control conditions of a cooling fan motor;
a motor controller configured to drive the cooling fan motor of the battery based on the received information regarding the control conditions of the cooling fan motor, and request a backup process of a control of the cooling fan motor when an error in CAN communication by the CAN communicator or an error of the vehicle occurs; and
a backup processor configured to compensate for an output signal of the cooling fan based on at least one of an air conditioner pressure transducer (APT) output value, a vehicle speed, and a cooled water temperature according to the request of the motor controller and transmit the compensated output signal of the cooling fan to the motor controller,
wherein when the error in the CAN communication occurs and the APT output value does not satisfy a first condition, the backup processor is configured to compensate for a control output of a previous output signal of the cooling fan by about 150% and transmit the compensated output signal of the cooling fan to the motor controller.

2. The apparatus according to claim 1, wherein when the error in the CAN communication occurs and the APT output value satisfies a first condition, the backup processor is configured to operate the motor controller to adjust an output of the cooling fan motor based on an air volume of an air conditioner.

3. The apparatus according to claim 2, wherein the first condition is that the APT output value is equal to or greater than about 1.5V and is less than about 5V.

4. The apparatus according to claim 1, wherein the first condition is that the APT output value is equal to or greater than about 1.5V and is less than about 5V.

5. The apparatus according to claim 1, wherein when the error in the CAN communication occurs and the APT output value satisfies a second condition, the backup processor is configured to determine whether a vehicle speed sensor fails, and when the vehicle speed sensor fails, the backup processor is configured to operate the motor controller to operate the cooling fan motor at a maximum output.

6. The apparatus according to claim 5, wherein the second condition is that the APT output value is about 0V.

7. The apparatus according to claim 5, wherein when the vehicle speed sensor does not fail and the vehicle speed is less than a reference speed, the backup processor is configured to compensate for a control output of a previous output signal of the cooling fan by about 120% and transmit the compensated output signal of the cooling fan to the motor controller.

8. The apparatus according to claim 1, wherein when the vehicle speed sensor does not fail and the vehicle speed is equal to or greater than a reference speed, the backup processor is configured to compensate for a control output of a previous output signal of the cooling fan to be about 80% of the maximum output of the cooling fan motor and transmit the compensated output signal of the cooling fan to the motor controller.

9. The apparatus according to claim 1, wherein when the APT output value and the cooled water temperature satisfy a third condition when an air conditioner is operated in a turned-on state, the backup processor is configured to determine an error state of the vehicle and compensate for a control output of a previous output signal of the cooling fan by about 70% to transmit the compensated output signal of the cooling fan to the motor controller.

10. The apparatus according to claim 9, wherein the third condition is that the APT output value is greater than about 0V and is less than about 1.5V, and the cooled water temperature is equal to or less than about 90° C.

11. The apparatus according to claim 1, wherein when the APT output value and the cooled water temperature satisfy a fourth condition when an air conditioner is operated in a turned-on state, the backup processor is configured to determine an error state of the vehicle and compensate for a control output of a previous output signal of the cooling fan by about 150% to transmit the compensated output signal of the cooling fan to the motor controller.

12. The apparatus according to claim 11, wherein the fourth condition is that the APT output value is about 0V or about 5V, and the cooled water temperature is equal to or greater than about 100° C.

13. A method for controlling a cooling fan of a battery of a vehicle, the method comprising:
    transmitting and receiving, by a controller area network (CAN) communicator, a signal with a battery management system (BMS) of the vehicle, and receiving information regarding control conditions of a cooling fan motor;
    driving, by a motor controller, the cooling fan motor of the battery based on the received information regarding the control conditions of the cooling fan motor;
    when error in controller area network (CAN) communication or an error state of the vehicle occurs while driving the cooling fan motor, compensating for, by a backup processor, an output signal of the cooling fan based on at least one of an air conditioner pressure transducer (APT) output value, a vehicle speed, and a cooled water temperature; and
    operating, by the motor controller, the cooling fan motor according to the compensated output signal of the cooling fan,
    wherein the compensating for of the output signal of the cooling fan includes compensating for a control output of a previous output signal of the cooling fan by about 150% when the APT output value does not satisfy a first condition when the error in the CAN communication occurs, and operating the cooling fan motor according to the compensated output signal of the cooling fan.

14. The method according to claim 13, wherein the compensating for of the output signal of the cooling fan includes:
    determining, by the backup processor, whether a vehicle speed sensor fails when the APT output value satisfies a second condition when the error in the CAN communication occurs; and
    operating, by the motor controller, the cooling fan motor at a maximum output when the vehicle speed sensor fails.

15. The method according to claim 14, further comprising:
    compensating for, by the backup processor, a control output of a previous output signal of the cooling fan by about 120% when the vehicle speed is less than a reference speed; and
    compensating for, by the backup processor, the control output of the previous output signal of the cooling fan to be about 80% of the maximum output of the cooling fan motor when the vehicle speed is equal to or greater than the reference speed, when the vehicle speed sensor does not fail.

16. The method according to claim 13, wherein the compensating for of the output signal of the cooling fan includes determining an error state of the vehicle and compensating for a control output of a previous output signal of the cooling fan by about 70%, when the APT output value and the cooled water temperature satisfy a third condition when an air conditioner is operated in a turned-on state.

17. The method according to claim 13, wherein the compensating for of the output signal of the cooling fan includes determining an error state of the vehicle and compensating for a control output of a previous output signal of the cooling fan by about 150%, when the APT output value and the cooled water temperature satisfy a fourth condition when an air conditioner is operated in a turned-on state.

* * * * *